Feb. 16, 1971 J. W. KLOCK 3,563,888
METHOD AND APPARATUS FOR TREATING WASTE-CONTAINING LIQUOR
Filed Aug. 21, 1968
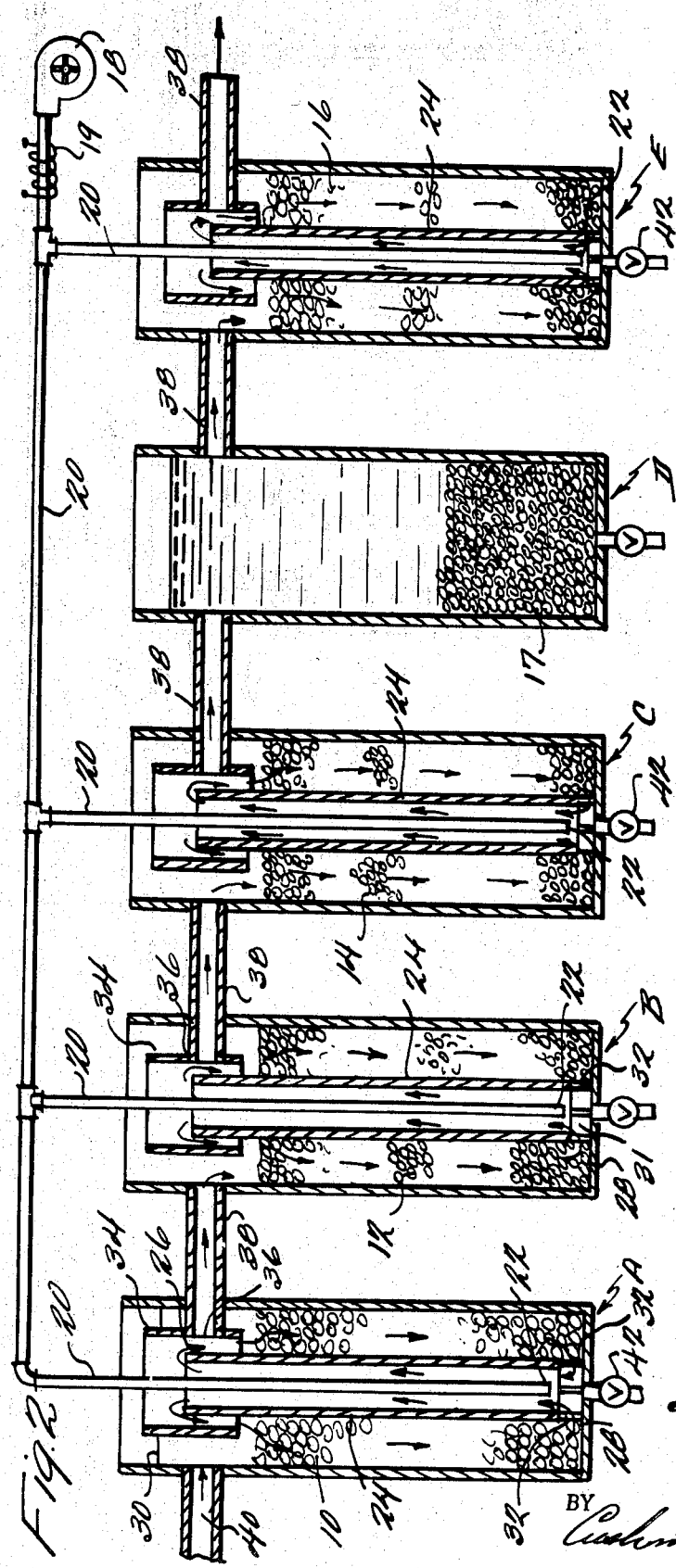
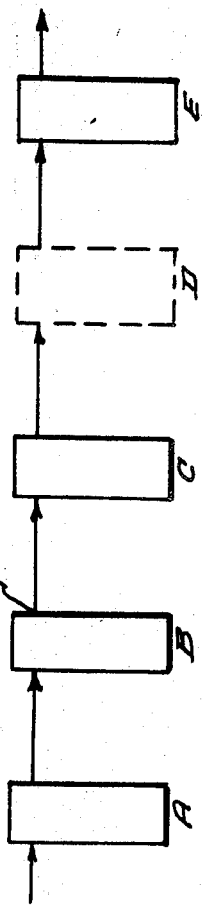
INVENTOR
JOHN W. KLOCK
BY
Cushman, Darby & Cushman
ATTORNEYS

United States Patent Office 3,563,888

Patented Feb. 16, 1971

3,563,888
METHOD AND APPARATUS FOR TREATING WASTE-CONTAINING LIQUOR
John W. Klock, Tempe, Ariz., assignor to Research Corporation, New York, N.Y., a nonprofit New York corporation
Filed Aug. 21, 1968, Ser. No. 754,341
Int. Cl. C02c 1/04
U.S. Cl. 210—14
16 Claims

ABSTRACT OF THE DISCLOSURE

Waste-containing liquor is biochemically treated by continuously recirculating it through a sand-gravel filter media which is submerged in the liquor while continuously withdrawing a small portion of said liquor. A pressurized column of oxygen-containing fluid entrains and lifts the liquid waste through an unobstructed tube and recirculates it downwardly through the filter media. During the lifting process oxygen from the fluid permeates the waste in order to ensure active aerobic metabolism. The treated effluent is directed to a storage area, or preferably it is conveyed to another tank for further treatment.

BACKGROUND AND BRIEF DESCRIPTION OF THE INVENTION

This invention relates to a method and apparatus for treating a waste-containing liquor. More specifically, the present invention pertains to a method of aerating liquid containing waste in order to disperse bacterial culture in the waste as it continuously recirculated through a biochemical filter system.

Filter systems for treating liquid waste have been known for many years. However, the demonstrable inadequacies of these systems are causing increasing concern, particularly in view of the fact that water pollution is rapidly approaching critical proportions, both in the United States and elsewhere in the world. The ever-increasing needs of an exploding population, together with the decreasing supply of unpolluted water, has only been partially offset by rather limited improvements in conventional liquid waste treatment systems.

The purpose of this invention is to provide a novel and economically feasible method and apparatus for treating raw waste liquor and also for significantly reducing the waste residue which remains after treatment in a conventional system.

Present conventional filter systems are unable to solve the water shortage-pollution problem because of two basic shortcomings. First, conventional systems achieve only an 80–90% reduction in organics as measured by the biochemical oxygen demand (BOD). This means that the effluent or treated liquid is seldom sufficiently filtered to satisfy drinking, bathing and/or industrial requirements. Secondly, conventional systems which are capable of effecting a higher organics reduction are economically unfeasible and/or excessively cumbersome.

Waste treatment is effected as a result of the cellular multiplication and metabolism of the waste by bacteria which are brought into contact therewith. These life processes are directly regulated by and dependent upon the amount of oxygen in the liquor; oxygen is needed in order to ensure active bacterial life. The normal oxygen supply in the liquid waste is rapidly exhausted by active bacterial metabolism within the liquid waste. It is therefore necessary to introduce additional oxygen into the system in order to ensure that the process of metabolism continues. The amount of oxygen which is required to achieve a stabilization of oxygen supply, relative to the oxygen demand by the bacterial activity in the liquid waste, is specified as the Biochemical Oxygen Demand (BOD). The BOD is the oxygen in parts per million required to achieve stabilization of the organic material during the course of the aerobic bacterial action. The principle upon which aerobic biochemical waste systems are grounded is that bacterial culture brought into contact with the waste will metabolize the waste particles, flocculate and then settle out.

Biological sewage treatment thus is a process in which microorganisms metabolize waste products producing gaseous and soluble molecular end products, and additional bacterial cells. The rapidity and effectiveness of the process is aided by increasing the quantity of bacterial cells, or standing crop, available to carry out the metabolism. The concentrating and holding of the organisms in the system is attained by one of several physical or biological techniques including flocculation, sedimentation and large surface areas for bacterial multiplication.

The two conventional processes employing high concentrations of bacteria are the activated sludge and trickling filter. Both rely upon a separate and subsequent sedimentation to separate the bacteria from the now "treated water." In the former process, the bacteria are returned to the inlet of the process after being held a sufficient time to become hungry or "active" and thus the name, activated sludge. In the latter process, the trickling filter, a very large surface area in the filter allows rapid and continuous bacterial growth. Upon aging, chunks of bacteria drop away and are recovered in a subsequent sedimentation basin. The bacteria are in a form that cannot be reused, necessitating disposal in a separate process. In some cases, the waste water is recirculated through the filter several times (high rate process) to effect a better contact with the bacteria.

The novel submerged filter process of the present invention combines elements of all processes—"activated" bacterial culture, large surface area and filtration which, in a broad sense, is a form of sedimentation. The submerged biological filter in one illustrative embodiment of the present invention comprises a vessel filled with gravel 4 to 12 feet deep with a centrally located pipe running vertically through the filter bed. It is 4 to 6 inches in diameter and is perforated over the lower 6 to 12 inches. On the inside bottom of the pipe is an air bubbler and a drain valve for occasional cleaning and repair. The vessel is filled with waste to a level 12 to 18 inches above the gravel and the air bubbler started forming an air lift pump. Waste begins rapidly circulating down through the gravel and up to the pipe and back through the gravel. As the waste circulates, particles are separated out in the gravel and a dense flocculant aerobic bacterial culture develops throughout the filter. The submerged culture is porous and flocculant and does not adhere to the stone as a thick slime layer which is the case in the conventional trickling filter. Concentrations from 3000 to 60,000 mg./liter will develop in proportion to the influent waste concentration.

Still referring to the same illustrative embodiment of the invention, the air lift rapidly propels the waste through the system completing a cycle every minute or so. With each cycle, the waste is (1) exposed to the active bacterial culture, (2) the water is reaerated and the dissolved oxygen quickly transferred to the bacterial culture, and (3) gaseous metabolic end products such as $CO_2$ are vented to the atmosphere. During the course of treatment, the waste is advantageously recycled several hundred times and an important feature of the invention is to provide a large recirculation to throughput ratio in the vessel. The recirculation ratio is equal to the quantity of liquor or water circulated through the airlift in the vessel per unit time divided by the quantity of liquor or water passing through the treatment process (e.g., passing completely through the vessel) per unit time. This ratio may vary from around 20 to about 1000, and some illustrative examples will be given hereinbelow. This gives a large oxygen supply, vents the medium, and gives the organisms many chances to metabolize the impurities.

The gravel forms a myriad of niches for the development of a dense bacterial culture. It additionally forms a porous matrix; thus mechanically suspending the culture throughout the media. Air volumes range from 0.3 to 3% of the water pumped requiring 0.5 to 5 H.P. per million gallons of waste treated per day. In the conventional activated sludge process, approximately 20 to 50 H.P. are required for the same volume and over 90% of the air is used to hydraulically suspend the culture at levels of 1000 to 2000 mg./liter. Loss of air causes the culture to settle to a thick mat on the bottom that quickly deteriorates anaerobically.

By holding the culture, the submerged filter essentially functions in reverse to the conventional activated sludge process wherein the bacterial culture is separated and reintroduced into the raw waste. Here the raw waste is passed through the statically suspended culture. The concentration will continue to increase until an equilibrium is achieved and there are enough bacterial cells to metabolize all the waste. By placing the submerged filters in series, in the illustrative embodiment of my invention, each cell adjusts to the waste concentration remaining in the previous unit and carries out additional metabolism resulting in essentially complete oxidation of the waste producing $CO_2$, and carbonate, nitrate, phosphate and sulfate ions.

Variations in waste loading in the first unit in series results in a similar variation in cell tissue production which is sequentially handled in the following units and by so doing essentially no excess bacterial culture accrues in the final effluent. Submerged filter media size starts in the illustrative embodiment of my invention with a coarse gravel in the first unit in series and is progressively reduced to improve hydraulic filter performance and stability, and by so doing improve particulate removal as the biological needs are satisfied. In both conventional systems, referred to, the relatively low and constant bacterial culture concentrations produce considerable excess sludge which requires an additional process—the anaerobic digester.

Rates of intestinal organisms removal are high. When the submerged filter of the present invention is used as a tertiary process behind conventional "complete treatment" with activated sludge, coliform concentrations are reduced to $\frac{1}{200}$ to $\frac{1}{1000}$ the usual effluent levels, thus approximating bathing water concentrations.

The following results are average values from a 3-month field study using the treated effluent from a conventional activated sludge process.

| Item | Influent [1] | Concentrations for various detention times in 4-unit, series arranged, submerged filters | | |
|---|---|---|---|---|
| | | 2.7 hours | 4.3 hours | 10.2 hours |
| BOD mg./l | 15 | 4.8 | 1.9 | 0.56 |
| COD mg./l | 69 | 18.5 | 12.1 | 6.3 |
| Turbidity p.p.m. $SiO_2$ | 8.5 | 1.1 | 0.4 | 0.3 |
| $NO_3$-N mg./l | 0 | 13.7 | 18.9 | 23.7 |
| Coliform (MPN) No./100 ml | 5,000,000 | 21,000 | 29,000 | 2,640 |

[1] Conventional activated sludge plant effluent.

Thus, the process and apparatus of the present invention provide for the complete oxidation of nitrogen and sulfur-containing organic material to nitrate, sulfate, carbon dioxide and water. The carbon dioxide is swept out with air in the airlift pump. The nitrate and sulfate remain in the effluent. Organics not containing nitrogen and sulfur are oxidized to carbon dioxide and water. Dissolved phosphates are unchanged. At present, the effluent could be used for irrigation (a preferred use, as the nitrates and phosphates would be useful as fertilizers), and industrial purposes, primarily for cooling and bathing.

Additionally, as indicated, the process of the invention provides for removal of harmful organisms, such as coliforms, to a much higher degree than the present conventional procedures, and there is virtually complete elimination of particulate matter. Effluent sewage turbidities from conventional treatment plants run normally about 20 p.p.m. equivalent silicon dioxide vs. 1.5 p.p.m. from the process of the present invention. There is no solids by-product production which requires disposal as is the case with currently-used methods, and there is no build up of organisms which need removal by back-washing or dewatering and thus no necessity to have large retention basins or drying or incineration equipment for disposal of solids.

If desired, the number of steps, i.e. number of vessels used in the treatment can be varied, depending upon the degree of pollution of the influent (that is, the inflowing liquid waste) and the desired degree of filtration of the effluent. While most of the impurities such as insecticides, detergents, antibiotics, and similar organic molecules are removed in the aerated filters, an activated carbon unit may be used in a subsequent procedure, as a polishing step, if that were desired to ensure complete removal of such impurities, and also odor and color.

In addition to the advantages mentioned above, other advantages will become apparent in the more detailed description of the invention which follows; reference will be made to the accompanying drawings in which:

FIG. 1 is a schematic view of the system, illustrating the various ways in which the system can be used; and FIG. 2 is a cross-sectional side view of the system, including the tanks, the pump and associated tubing, the filter media, the lift tube and baffle, and the tank transfer tubing.

DETAILED DESCRIPTION OF THE INVENTION

Referring to the drawings, which show an illustrative embodiment of the invention, FIG. 1 illustrates a schematic representation of a series of vessels, tanks or compartments A, B, C, D, and E, and filter media 10, 12, 14, 17, 16 are shown as provided in compartments A, B, C, D and E respectively. These tanks or vessels may be of any suitable configuration, and in the process of the invention, biochemical reactions occur in the vessels. For this purpose an active bacterial culture is suspended within the voids of the filter medium, and the filter medium may comprise gravel or sand, or any suitable material. Waste is aerobically metabolized within the containers, and additionally, the system is designed to effectively vent metabolically derived gases, such as carbon dioxide ($CO_2$) to the atmosphere. Any nitrogen present in the impurities will be oxidized under the prevailing aerobic conditions to nitrate, which is soluble.

The specific size and grading of the filter media in the vessels may be varied in accordance with the needs of a particular system, as will be evident.

The tank system described above may be employed where raw sewage is to be treated. On the other hand, if the system is utilized to treat waste which has previously been partially filtered by a conventional system, only one of tanks A, B, and C may be utilized.

The effluent from tank C is conveyed to tank D, where further treatment of the effluent may be effected, if desired. The filter medium 17 in tank D may be comprised of fine sand.

Tank E contains an adsorption filter media such as activated carbon. Accordingly, insecticides, detergents, antibiotics and similar organic molecules will be removed at this stage by adsorption. The effluent from tank E is suitable for reuse or discharge into natural water.

The number of filtration steps in the present inventive system can of course, be altered, depending upon the degree of pollution of the influent and the desired composition of the effluent. For example, tanks A and B may be eliminated from the system and tank C may be used to directly treat the effluent from the outlet port 15 of what would be a conventional activated sludge or trickling filter system (not shown). The advantage of this arrangement is that it will allow the present invention to be used with existing conventional treatment systems to upgrade the quality of the effluent.

Referring now to FIG. 2 of the drawings, the tanks or containers A, B, C, D, and E are shown in vertical or longitudinal cross section. Several of the tanks are initially partially filled with an appropriate filter medium such as a sand-gravel mixture in tanks A, B, and C, fine sand in tank D, and activated carbon in tank E. After the tanks have been partially filled with the filter media, the waste-containing liquor to be treated is introduced to the tank system via conduit 40. A sufficient quantity of waste is introduced to completely submerge the filter media, as well as the tubes 24 and conduits 38 within the respective tanks. The liquid waste would be admitted to the tank A such that the surface or upper level of the waste would be at the point indicated at 30 in tank A. It should be noted that the upper end of baffle 34 is located above the surface 30 of the liquid waste.

While the following discussion will be specifically directed to what occurs in tank A, it will be understood that it is equally applicable to tanks B, C and E unless stated otherwise.

A conventional source of compressed air such as an air pump is indicated at 18. Air pump 18 is shown in fluid communication with tanks A, B, C, and E by means of a pipe system 20. Air or some other suitable oxygen-containing gas is conveyed via pipes 20 to the base of container A, where it issues from outlet nozzle 22. A vertically-oriented tube member 24 provides an unobstructed flow path or passageway about air pipe 20. Tube 24 defines a generally vertical space through filter medium 10. If desired, the air may be heated in a conventional manner by positioning a standard heating coil 19 around pipe 20 so that the air is heated as it is pumped from compressor 18. This could be done to increase the metabolic rate in the system. A normally closed drain valve 42 is shown at the bottom of the vessel.

Tube 24 is provided with open upper and lower ends. The upper end 26 is located beneath the surface 30 of the liquid waste, while lower end 28 is arranged at the bottom of the tank as shown. Suitable inlet openings are provided in the tube 28 adjacent the bottom thereof as indicated at 31, 32. Accordingly, the waste-containing liquor will enter tube 24 by flowing through the inlet openings 31, 32.

At this point the liquid waste will be conveyed upwardly by being mixed with or entrained in the rising air column which is emanating from the outlet nozzle 22. Waste-containing liquid which is now entrained with the air flows upwardly in an unobstructed path within tube 24 until it reaches the upper end 26 of tube 24. Here it flows outwardly over the upper end of the tube 24.

Part of the outflow strikes or is directed against an annular baffle member 34 which surrounds the upper portion of tube 24. The liquid flow which is directed against the baffle 34 will generally be redirected through the filter media 10 in a downwardly-oriented flow path. Thus, a continuous recirculation will be established within the vessel A.

Meanwhile, a portion of the outflow of the liquid waste from tube 24 will pass through an opening 36 in baffle 34 to conduit 38, and then to the next filter tank in the series. Or, if desired, the outflow could be directed to any appropriate runoff or reservoir storage area. The lower surface of pipe 38, in the space between baffle 34 and the adjacent side wall of the vessel or tank may be provided with suitable openings (not shown), if desired, to let particles in the exiting liquor pass downwardly therethrough and back into the same vessel, thus providing a sedimentation basin. The openings will provide enough resistance to keep water from the vessel from passing upwardly therethrough and into conduit 38.

The influent, which is continuously introduced through inlet port 40 at a constant flow rate, is directed downwardly through the filter medium 10 by impinging against or striking the outer wall of baffle member 34. Thus it is not allowed to pass directly across the top of the tank and out through opening 36 without undergoing filtration since the upper end of baffle 34 is maintained above the surface 30 of the liquid waste.

The column of air which emanates from outlet nozzle 22 does not merely entrain and lift the liquid waste upwardly. First, it lifts at a rate which ensures a rapid circulation and hence a high metabolic rate. Secondly, as it lifts the liquid waste through tube 24, the oxygen in the air permeates the liquid waste which is entrained in the air column, thus transferring a sufficient quantity of oxygen to the waste to "re-trigger" or "re-invigorate" the process of aerobic metabolism. Oxygen is rapidly exhausted during aerobic metabolism. Hence oxygen must be continually supplied in order to ensure that the waste is effectively metabolized.

An important feature of the invention is the use of the fluid lift pump in combination with the construction of the vessel including the structure for inflow, recirculation within the vessel, and outflow of the waste-containing liquor whereby a large recirculation to throughput ratio of the liquor is effected in a submerged biological operation. This recirculation ratio is defined as being equal to the quantity of water or liquor circulated through the fluid lift passageway in pipe 24 in the vessel per unit time divided by the quantity of water or liquor passing through the treatment process (through outlet 38) per unit time. This ratio may be varied for example by varying the input flow rate of liquor into the vessel. An illustrative range for this ratio is between about 20 and 1000 to 1. This provides a substantial improvement over conventional systems wherein the recirculation ratio is in the range of between about 1 and 5 to 1.

Since the filter media are submerged and hence not directly exposed to the atmosphere, the bacterial culture is highly porous and flocculant, and circulation is not retarded, as is the case in a trickling filter system. Since waste metabolism is high in the first tank A, only small quantities of waste remain and very limited bacterial production occurs in the downstream tanks, for example B and C, thus allowing the use of fine filtering media in those downstream tanks, and improving hydraulic stability and filter performance. System design and filter characteristics are thereby improved by exposing waste to more bacteria in less space than is possible in conventional systems.

In connection with providing the downstream vessels with a finer filtering media than the first vessel A, the following table gives figures for recirculation ratios in vessels A and B wherein the particulate filtering media in vessel A was of an average particle diameter of 1.5 inches, and of an average particle diameter of 0.4 inch in vessel B, and wherein the filter bed was approximately 6 feet deep.

|  | Recirculation ratio in— | |
|---|---|---|
|  | Vessel A | Vessel B |
| Run: | | |
| 1 | 28 | 20 |
| 2 | 84 | 60 |
| 3 | 168 | 120 |
| 4 | 670 | 480 |

The input flow rate of liquor into vessel A was three times greater in Run 1 than in Run 2, two times greater in Run 2 than in Run 3, and four times greater in Run 3 than in Run 4. It will be understood that this input flow rate will be taken as a constant for any particular run.

Thus, it will be seen that the recirculation ratio is less in the downstream vessel, and this is satisfactory inasmuch as the liquor has already been initially treated in vessel A before coming to vessel B, and therefore a smaller recirculation ratio suffices in the downstream vessel.

It will be noted that by submerging the filter completely beneath the surface 30 of the waste-containing liquor, and centrally positioning the air lift piping or tubing, it is possible to efficiently maintain continuous recirculation within the system. Since the upper end 26 of tube 24 remains below the surface of the liquor at all times, it is not necessary to lift the liquor above the surface. Hence circulation power requirements are exceedingly small—on the order of 0.1 to 3.0% of that required in conventional systems.

It is apparent that while the preferred embodiment of the invention illustrated in FIG. 2 depicts the air pipe 20 and tube member 24 as centrally located within the tank, variations in this configuration could be made while remaining within the scope of the invention. For instance, the filter media could be centrally located and the air lift pumping means could surround the media in such a manner that a circuitous circulation could still be maintained. Or, each vessel could have multiple air lifts like the structure of air lift 20, 24 arranged therein.

The present invention results in a more efficient filter system than any heretofore proposed, both in terms of rate of metabolism and size and expense of the equipment. Moreover, it is equally important to recognize that the employment of the method and apparatus of the invention also results in a dramatic increase in the quality of the treated effluent.

Tests have been made comparing the effluent of the inventive system with that of a modern activated sludge system. The impact of such a comparison may be appreciated even more when it is realized that activated sludge systems are generally more efficient than are the conventional trickling filter systems which have been previously described.

The test results showed a significant reduction of biochemical oxygen demand (BOD) when filtration according to the principles discussed herein is utilized. The BOD has been noted to be the amount of oxygen in parts per million required during metabolic assimilation of organic matter by aerobic bacterial action. BOD is generated by carbonaceous organic material usable as a source of food by aerobic organisms, oxidizable, nitrogen derived from nitrite, ammonia and organic nitrogen compounds which serve as food for specific bacteria, and from certain chemical compounds such as ferrous iron, sulfite and sulfide which react with molecularly dissolved oxygen.

As mentioned previously, the present invention may be employed either to upgrade the effluent from a conventional system, or to treat primary waste (raw sewage) as such. When it is used to upgrade effluent which has been treated in a conventional system, the effluent may be introduced to the inventive system at point 15 in FIG. 1.

Tests were conducted on an effluent from an activated sludge system which had a biochemical oxygen demand (BOD) average of 17 milligrams per liter after treatment in the sludge system. This effluent was serially processed through three submerged filter tanks of the present invention. The effluent was detained in the first tank using a biochemical filter for .3 days and the BOD of the resulting effluent dropped sharply from an average of 17 milligrams per liter mentioned above to only 2.6 milligrams per liter. Additional filtering in the second tank, again using a biochemical filter resulted in further cutting the BOD from an average of 2.6 milligrams per liter to 1 milligram per liter over a total filtration period of .6 days. The effluent was then filtered in a third tank utilizing the inventive principles with an activated carbon and biochemical filter media for a total of .9 days detention time. This filtration reduced the BOD still further to an average of .4 milligrams per liter, as compared to the average of 17 milligrams per liter for the activated sludge system. And holding times lower than those mentioned have been found to be effective, the holding time depending on the waste treated.

The chemical oxygen demand (COD) in the same series of tests resulted in cutting the COD from an average of 84 milligrams per liter for the activated sludge effluent to an average of 22 milligrams per liter after filtration in the first tank, to 17 miligrams per liter after filtration in the second tank, and ultimately to 3.7 milligrams per liter after filtration in a third tank containing a submerged biochemical and carbon filter media.

The striking results delineated above were repeated when the inventive system was used to treat raw sewage waste. Once again, three tanks containing the innovative system were employed. The first tank contained a rough grade biochemical filter media, the second tank a medium grade biochemical filter media and the third tank contained a fine grade biochemical media as well as carbon. The BOD of the untreated raw sewage was 197. With a detention time of only .5 days, the BOD was cut from 197 to an average of 4.6 milligrams per liter after filtration in the first tank. This initial filtration resulted in an effluent having an average BOD approximately 75% lower than that found in the final effluent of the activated sludge treatment. Filtration in the second tank for a total of .7 days lowered the BOD to an average of 1.6 milligrams per liter, and a third filtration in the biochemical and carbon filter tank for a total of .9 days resulted in an effluent containing a BOD with an average of only 1 milligram per liter, as opposed to an average of 17 milligrams per liter for the final effluent of the activated sludge system.

The COD of the untreated raw sewage influent was initially 473 milligrams per liter. This was cut to an average of 29 milligrams per liter in the first tank, as compared with a final effluent COD average of 84 of sewage which was treated in the activated sludge system. The COD was reduced to 23 milligrams per liter in the second tank and ultimately to only 7 milligrams per liter in the third tank of the inventive system.

In the same series of tests using raw sewage influent, the turbidity of the raw sewage was cut to an average of 1.5 p.p.m. equivalent silicon dioxide ($SiO_2$) after only three filter treatments. The water was optically indistinguishable from household tap water.

Dramatic results were likewise observed with reference to other tests conducted on the filtration efficiency with respect to the present invention. For instance, the coliform index of raw sewage influent showed a most probable number (MPN) of coliform organisms as five million per 100 milliliters waste. After consecutive treatment of the waste in consonance with the inventive principles disclosed herein, this figure was cut to an MPN of 330 per 100 million parts. This represents a reduction of coli of over 99.9%.

It is apparent therefore, that the present invention provides an advantageous method and apparatus for treating waste liquor. The system is able to effectively treat either raw sewage or waste which has previously been inadequately treated by conventional methods such as activated sludge systems or filter trickling systems. Moreover, it does so in a relatively inexpensive manner, due to the relative simplicity of the equipment employed as well as the fact that the power requirements of the pump are from 0.1 to 3% of those of conventional systems.

It will be understood that the shape of the tanks or vessels A, B, C, D, E may be varied, as desired. These tanks could be replaced by a multi-compartmented single tank wherein the compartments were formed by dividers in the tank, and each compartment was provided with input, output, and air lift pump means as provided in vessel A.

The size of the filtering media used likewise may be varied, as desired, and it is not essential that it be graded in size from one vessel to the next. The same gravel, in fact, may be used as the filtering media for all vessels, if desired. The gravel particle size is selected to provide suitable passageways of relatively appreciable dimensions between particles. A suitable range of average particle size would be from about ¼ inch to 1.5 inches in diameter. Pebbles and gravel could be used, mixed together, and as indicated above, fine filter media, coarse sand for example, could be used in a polishing step in order to obtain higher clarity, if desired, but too fine a media would tend to plug.

Although the mehod and apparatus of the invention have been described with reference to a particular embodiment, it will become apparent to those skilled in the art that variations can be made in the inventive system. All such variations as would be obvious to those skilled in this art are intended to be included within the scope of this invention.

What is claimed is:

1. A method of treating waste-containing liquor comprising the steps of:
 providing a first vessel with a filtering medium therein and a separate open fluid passageway in communication with said medium, said passageway being at least substantially free from said filtering medium;
 introducing a waste-containing liquor into said vessel;
 introducing an oxygen-containing gas into said passageway to provide a pumping action in said passageway whereby said gas and said liquor flow together in a single upward direction through said passageway;
 continuously circulating said liquor within said vessel and through said filtering medium and said passageway by means of said pumping action; and
 continuously withdrawing from said vessel a portion of said circulating liquor.

2. A method as defined in claim 1 wherein:
 the ratio of the flow rates of liquor flowing in said passageway and withdrawn from said vessel is between about 20 and 1000.

3. A method as defined in claim 1 wherein the filtering medium is submerged in the circulating liquor, and continuously venting gases from the passageway and the vessel.

4. A method as defined in claim 2 wherein the waste containing liquor contains organic nitrogen compounds, organic sulfides and organic carbon, and wherein the oxygen containing gas oxidizes the organic nitrogen compounds, the organic sulfides and the organic carbon to nitrates, sulfates, and carbon dioxide respectively.

5. A method as defined in claim 4 wherein the oxygen containing gas is heated prior to admission into said passageway, and wherein said filtering medium comprises a biochemical including a mixture of sand and gravel.

6. A method as defined in claim 1 and further comprising:
 continuously introducing said liquor withdrawn from said first vessel into a second vessel having a filtering medium therein and a separate open fluid passageway in communication with said medium, performing the steps recited in claim 1 in said second vessel, and wherein the ratio of the flow rates of liquor flowing in the passageway of the firts vessel and withdrawn from the vessel is greater than the corresponding ratio in said second vessel.

7. The method as defined in claim 6 wherein said ratio in said first vessel is between about 75 and 250, and wherein said ratio in said second vessel is between about 50 and 175.

8. Apparatus for treating waste-containing liquor comprising; a vessel; means for introducing said liquor into said vessel; a filtering medium in said vessel; means defining an open fluid passageway through said medium, said passageway being at least substantially free from said filtering medium; pumping means operatively associated with said passageway defining means to provide a flow of oxygen-containing gas through said passageway; said passageway defining means having inlet and outlet means spaced from each other within said vessel to provide with said filtering medium a path within said vessel for the continuous circulation and recirculation of liquor through said filtering medium and said passageway; said passageway being arranged so as to have flow of liquor therethrough in single upward direction; and second outlet means operatively connected to said path for withdrawal from said vessel of some of the liquor circulating in said path.

9. Apparatus as defined in claim 8 including means providing a ratio of between about 20 and 1000 between the flow rates of liquor flowing in said passageway and withdrawn from said vessel.

10. Apparatus as defined in claim 8 wherein said vessel and said outlet means of said passageway are both open to the atmosphere.

11. Apparatus as defined in claim 9 wherein said second outlet means is arranged adjacent to said passageway outlet means.

12. Apparatus as defined in claim 10 wherein said passageway is arranged vertically through said filtering medium with said inlet means being disposed adjacent the bottom of said vessel and said first outlet means being disposed above said filtering medium.

13. Apparatus as defined in claim 12 wherein said passageway is defined by a tubular member open at the bottom and top and having imperforate side walls, and wherein said first outlet means comprises an annular member spaced from and enclosing the upper end of said tubular member and acting as a baffle to direct circulating liquor back through the filtering medium.

14. Apparatus as defined in claim 13 wherein said second outlet means is operatively connected to said annular member.

15. Apparatus as defined in claim 8 and further including: a second vessel connected to said first vessel by said second outlet means whereby liquor withdrawn from said first vessel will flow into said second vessel; a filtering medium in said second vessel; and means in said second vessel including pumping means introducing an oxygen-containing gas into said second vessel for continuously circulating the liquor within said second vessel and through said second filtering medium; and means for continuously withdrawing from said second vessel a portion of the liquor circulating therein.

16. Apparatus as defined in claim 15 wherein the filtering media in said vessels is particulate and coarser in said first vessel than in said second vessel, and wherein the ratio of the flow rates of liquor flowing in said passageway in the first vessel and withdrawn from said first vessel is greater than the corresponding ratio in said second vessel.

References Cited

UNITED STATES PATENTS

| | | | |
|---|---|---|---|
| 607,426 | 7/1898 | Ducat | 210—17 |
| 1,991,896 | 2/1935 | Hays | 210—17 |
| 2,188,162 | 1/1940 | Schulhoff | 210—17X |
| 3,402,125 | 9/1968 | Tanaka | 210—17X |

OTHER REFERENCES

Metcalf, L., et al.: American Sewerage Practice, vol. III, Disposal of Sewage, 3d edit., 1935, pp. 467–476.

MICHAEL ROGERS, Primary Examiner

U.S. Cl. X.R.

210—17, 150, 197, 201